Oct. 10, 1967   J. R. YOUNKIN   3,346,217
ALTITUDE HOLD WITH AIR SPEED LIMIT
Filed March 11, 1966
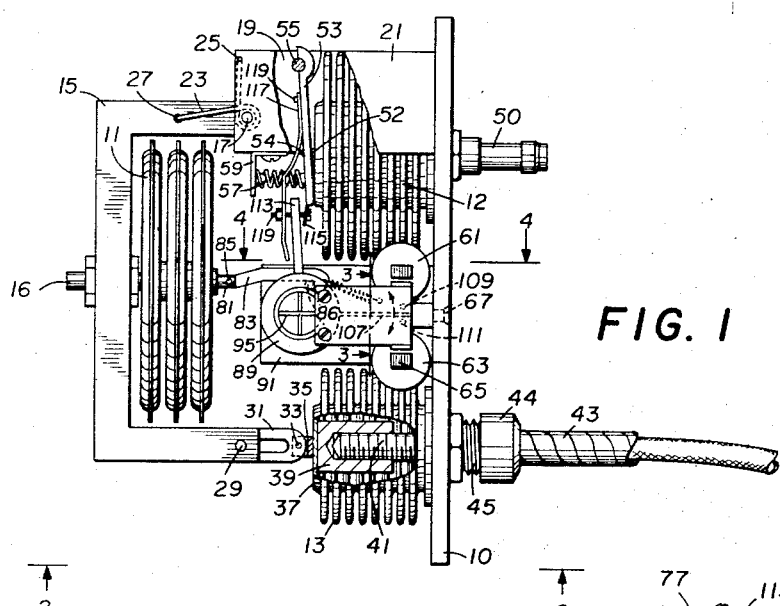
FIG. 1
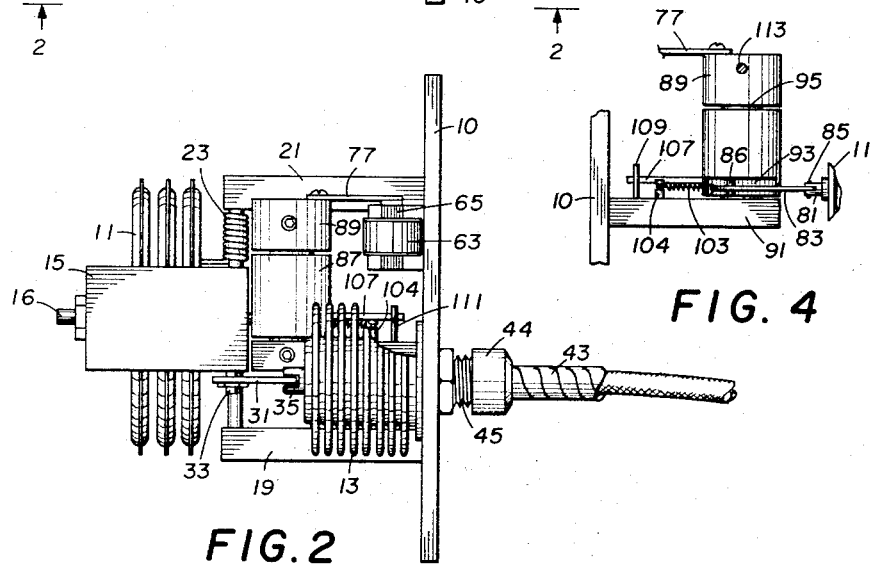
FIG. 2
FIG. 4
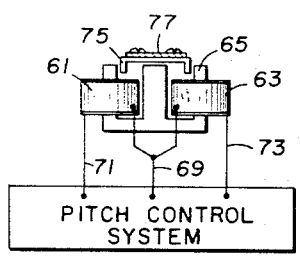
FIG. 3
INVENTOR
JAMES R. YOUNKIN
ATTORNEY

3,346,217
ALTITUDE HOLD WITH AIR SPEED LIMIT
James R. Younkin, Mineral Wells, Tex., assignor, by mesne assignments, to Thurman & Younkin, Inc., a corporation of Texas
Filed Mar. 11, 1966, Ser. No. 533,592
6 Claims. (Cl. 244—78)

ABSTRACT OF THE DISCLOSURE

A barometer for aircraft altitude control is linked to a control signal generator by way of an overriding coupling and cooperates with an air speed sensor which overrides and renders ineffective the barometer when the air speed is too high or too low, thereby to limit the rate of climb or rate of descent to within a predetermined range.

---

This invention relates to the automatic control of an aircraft, and more particularly to an altitude hold unit in which air speed is sensed and caused to limit the operation of the aircraft during change in altitude or when air speed is outside of preset limits.

In a more specific aspect, the invention relates to a linkage system for producing a condition for a pitch axis control in response to barometric pressure, with provision for overriding the same in dependence upon air speed.

The present invention relates to an improved aircraft control system for introduction of control signals to a powered pitch control system in which a simplified mechanism serves adequately to respond and, at the same time, to apply the essential limits to be placed on the aircraft during flight.

In accordance with the present invention, an altitude hold unit is provided for an aircraft having a pitch axis control. A pickoff unit is adapted to be connected to actuate the pitch axis control and has a movable member. Structure including a resilient support is provided for the movable member normally to unbalance the pickoff unit to produce a condition for the control which causes the aircraft to descend. A barometer is coupled to the structure for varying the position of the member and to actuate the pickoff unit in response to increased barometric pressures to produce a condition for the control which causes the aircraft to climb. An air speed responsive means is additionally coupled to the movable member for overriding the effect of the barometer on the movable member in response to air speeds outside of a predetermined range to attenuate the rate at which the aircraft responds to changes in the pickoff unit applied through the barometer.

For a more complete understanding of the present invention and for further objects and advantages thereof, reference may now be had to the following description taken in conjunction with the accompanying drawings in which:

FIGURE 1 is a top view of a control unit embodying the present invention;
FIGURE 2 is a view of the unit of FIGURE 1, taken along lines 2—2 of FIGURE 1;
FIGURE 3 is a partial sectional view, taken along lines 3—3 of FIGURE 1; and
FIGURE 4 is a side view of the flexural mounting, taken along lines 4—4 of FIGURE 1.

The system illustrated in the drawing provides for automatic control of an aircraft in which air speed, as sensed by a pitot tube, serves to provide a control function which will override a maximum command to climb or to dive so that excessive maneuvers will not be permitted while seeking a new altitude. However, when the air speed is within limits, the system will maintain a selected altitude.

One embodiment of the invention, illustrated in the drawings, includes a frame comprising a base plate 10 which supports primary linkage elements: an aneroid barometer 11; an air speed limit bellows 12; and an antibacklash coupling bellows 13.

The barometer 11 is mounted on a torque loaded, U-shaped yoke 15 by a threaded pin 16 extending from the rear plate of the barometer. The barometer 11 contracts and expands in response to changes in atmospheric pressure. The yoke 15 is pivoted at one end on a shaft 17 which is secured at its ends in fixed arms 19 and 21. Arms 19 and 21 are parallel and are cantilever mounted from the rear face of a base plate 10. A spring 23 encircles shaft 17 and engages pin 25 on arm 19 and pin 27 on yoke 15 tending to rotate the yoke 15 clockwise. A drag pin 29 extends from the lower surface of the free end of the yoke 15 and is coupled by a slotted drag link 31 to a pin 33 in the end of a shaft 35. Shaft 35 extends from the end 37 of bellows 13. A long nut 39, secured in the bellows 13 opposite shaft 35, is engaged by a threaded shaft 41. The shaft 41 is coupled to, or forms an extension of, a rotary flexible cable 43 which is secured by a cap 44 to a receptacle 45 which forms part of the structure of bellows 13. Receptacle 45 passes through a hole in the plate 10 and serves to anchor the bellows 13 onto the base plate 10 while accommodating the termination of cable 43. The cable 43 may be rotated to expand or contract the bellows 13 to command a change in altitude either to climb or descend. The bellows 13 serves to eliminate backlash in moving the yoke 15 while permitting adjustment by rotation to the cable 43. Thus, the yoke 15 is rotated on shaft 17 to vary the position of the barometer 11.

The barometer 11 is fastened at one end to the inside face of yoke 15 and extends forwardly from yoke 15 towards the plate 10. The barometer, thus selectively positioned, serves to sense altitude and will serve, as will hereinafter be described, automatically to correct changes in altitude of the aircraft.

The air speed of the craft is sensed through a coupling 50 which will be connected by a conduit (not shown) to a pitot tube. The coupling 50 leads to the interior of the air speed limit bellows 12. The bellows 12 is mounted on the base plate 10. The end plate of the bellows 12 opposite the base plate 10 has a centrally projecting cone 52. The cone 52 sits within a dimple or depression located at about the center of a control plate 53.

Plate 53 is pivoted on a shaft 55 which extends between the lower arm 19 and the upper arm 21. A spring 57 is mounted on a bracket 59 secured to arm 21 which extends to encircle a stud 61 on the rear face of the plate 53, thereby to place the bellows 12 under compression. This maintains the dimple 54 and the cone 52 is registration.

Movement of the bellows 12 and the barometer 11 is employed to control the balance of an E-pickoff. Coils 61 and 63, FIGURES 1 and 3, are mounted on an E shaped core 65. The core 65 is mounted by screws 67 as to be fixed in position on the rear surface of the base plate 10.

As best shown in FIGURE 3, the coils 61 and 63 have a common output line 69, with the line 71 extending from coil 61, and the line 73 extending from coil 63 to a pitch axis control unit. An iron vane 75, in the form of a shallow inverted U, is mounted on a control arm 77. The ends of vane 75 normally will be equally spaced from the ends of the E-core 65. However, if the vane 75 is moved to the left, as viewed in FIGURE 3, the inductance of coil 61 will increase and the inductance of coil 63 will decrease.

It will be seen that movement of the vane 75 produces an effect that may actuate a pitch axis control system. The inductances of coils 61 and 63 vary depending upon the position of the vane 75.

The movement of the vane 75 is made to be dependent upon altitude as sensed by the barometer 11, desired changes in altitude as introduced into the system by the rotation of the cable 43, and air speed as sensed by the bellows 12.

The linkage between the barometer 11 and the bellows 12 is shown in FIGURE 1. The barometer 11 has a central shaft 81 extending from the forward face thereof. A hook 83 is pivoted at one end from the end of the shaft 81 on a pin 85. The other end of the hook 83 engages a pin 86 extending from the bottom of a cylinder 87, shown in FIGURE 4. Cylinder 87 and a second cylinder 89 are supported above a flat arm 91 which extends from the rear face of the base plate 10. The lower cylinder 87 is supported from the arm 91 by a flexural pivot of the type manufactured and sold by the Bendix Corporation, Utica Division, Utica, New York. A pivot of series 5012–800 was found to be satisfactory in one embodiment of this invention. The lower end of the flexural pivot 93 is rigidly secured in a hole in the arm 91. The upper end of the pivot 93 is similarly secured within the lower portion of the cylinder 87. The upper cylinder 89 is supported from the cylinder 87 by a flexural pivot 95 which is identical to pivot 93. Thus, the lower cylinder 87 may rotate within limits relative to arm 91 on the pivot 93, while the upper cylinder 89 may rotate relative to cylinder 87 on pivot 95.

A flat plate 77 extends parallel to the upper surface of the cylinder 89 towards the base plate 10 and supports the vane 75 at the end thereof so that vane 75 pivots on the axis of the cylinder 89.

The free end of the hook 83 is coupled by way of a spring 103 to a pin 104 extending from the upper surface of the arm 91. Spring 103 opposes but is weaker than bellows 11. As best seen in FIGURE 4, the lower portion of cylinder 87 is cut away to permit the hook 83 to pass thereunder. The pin 86 extends downwardly from the lower surface of the undercut portion.

A bar 107 extends toward the base plate 10 from the lower portion of the cylinder 87. The end of the bar 107 may move between a low stop pin 109 and a high stop pin 111 both mounted on the upper surface of the arm 91. Thus, the bar 107 limits the rotation that the lower cylinder 87 may experience in response to torque applied there through hook 93 upon compression of the aneroid barometer. The flexural pivot 93 is initially adjusted to maintain the bar 107 against high pin 111. The barometer 11 may exert a torque to pull the bar 107 from pin 111 to pin 109. By this means the barometer 11 will exert control over the position of the vane 75 to cause the aircraft to climb or descend to a level such that the hook 85 rotates the vane 75 to its center position.

If a command to increase altitude is cranked into the system by the rotation of the cable 43, the bar 107 will move to the "low" stop 109. The resultant signal will energize the pitch control unit to raise the nose of the craft. If the air speed under such command falls below a predetermined limit, then the bellows 12 introduces control over the vane 75 to override the command and to limit the climb attitude until the air speed returns to within preset limits.

Override is accomplished through a bar 113 which extends from the upper cylinder 89 toward the arms 19 and 21. The end of bar 113 is positioned between a tab 115 extending from the edge of plate 53 and a flexible follower 117. Follower 117 is mounted as by screw 119 on the rear surface of the plate 53, and is coupled to the tab 115 at its extremity by means of an adjustment screw 119. If the air speed is too great, the bellows 12 expands so that the tab 115 contacts the bar 113, rotating the upper cylinder 89 counter-clockwise. If, in a climb, the air speed is too low, then the bellows 12 contracts pulling the end of the follower 117 into contact with the arm 113 rotating the upper cylinder 89 clockwise to lower the nose of the aircraft. This serves to override any command to descend or climb introduced by control of the lower cylinder 87 from the barometer 11. This brings the aircraft under control of the air speed limiter and changes the attitude of the aircraft to bring the speed within the preset limits. It will be seen that when the aircraft is below the altitude which is commanded, the barometer 11 is compressed too much. There is thus slack in the drag linkage 31. The hook 83 engages the pin 86, pulling the arm 107 against the low stop pin 109. As the plane flies upward, the barometer 11 expands until the drag link 31 becomes taut. Any further increase in the elevation causes the barometer 11 to expand further releasing the hook 83 from the pin 86 after the flexural pivot moves the vane 75 to the high stop.

The barometer maintains the altitude of the craft by control of the vane at a position which represents pickoff balance. Slight deviations in balance necessary to maintain altitude will be produced by the barometer rotating the vane 75. Thus, the system relates to the control of a pickoff unit for pitch axis control which is rotatable about an axis on a compound flexural pivot. An upper section of the pivot is directly connected to a movable element in the pickoff which is controlled by an air speed sensing device to alter the pitch of the aircraft so that the air speed will tend to be maintained within predetermined limits. A lower section on the pivot is controlled by and through a barometer to change the pitch of the aircraft as necessary to maintain a given altitude or to change from one altitude to another as may be commanded. In each case however the effect on the pickoff due to conditions introduced through the barometer are subject to being overridden by the air speed sensing device.

Having described the invention in connection with certain specific embodiments thereof, it is to be understood that further modifications may now suggest themselves to those skilled in the art and it is intended to cover such modifications as fall within the scope of the appended claims.

What is claimed is:
1. An altitude hold unit for an aircraft having a pitch axis control which comprises:
   (a) a pickoff unit adapted to be connected to actuate said control and having a movable member,
   (b) structure including resilient means supporting said member normally to unbalance said pickoff unit to produce a condition for said control to cause said aircraft to descend,
   (c) barometer coupled to said structure for varying the position of said member and to actuate said pickoff unit in response to increased barometric pressures for producing a condition for said control to cause said aircraft to climb, and
   (d) air speed responsive means additionally coupled to said structure for overriding the effect of said barometer on said member in response to air speeds outside of a predetermined range to attenuate the rate at which said aircraft responds to changes in said pickoff unit applied through said barometer.

2. The combination set forth in claim 1 in which said barometer is an aneroid barometer.

3. The combination set forth in claim 1 in which said structure comprises two units, a frame and flexural pivots supporting said units one above the other and on said frame.

4. The combination set forth in claim 1 in which said structure comprises a frame and a first body supported from said frame by a flexural pivot and linked to said barometer, and in which a second body is supported from said first body by a flexural pivot and supports said member and is linked to said bellows.

5. The combination set forth in claim 1 wherein:
(a) said structure includes a frame having
(i) a support arm extending therefrom with
(ii) a first flexural pivot mounted in said arm on an axis perpendicular to movement of said mount for said barometer,
(iii) a first body mounted on said pivot and coupled to said barometer,
(iv) a second body supported from said first body by a second flexural pivot and supporting said member and adapted to be linked to said bellows, and
(b) said movable mount is biased away from said main axis and is movable toward said main axis by a screw-actuated drag linkage.

6. An altitude hold unit for an aircraft having a pitch axis control which comprises:
(a) a frame,
(b) a pickoff unit mounted on said frame adapted to be connected to said control and having a movable member,
(c) a first body and a second body resiliently coupled to each other and to said frame for rotation about a main axis with said first body having means to support said member,
(d) a barometer,
(e) an adjustable mount movable relative to said frame supporting the barometer with its axis perpendicular to said main axis and with said barometer extending from said mount towards said main axis,
(f) resilient means for biasing said mount away from said main axis,
(g) means coupled to said mount for moving said barometer towards said main axis,
(h) a hook coupled to said barometer for engaging said second body to rotate said first body and said member relative to said main axis in a first direction by force from said barometer,
(i) an air speed dependent bellows, and
(j) means coupling said bellows to said first body to rotate said first body in either direction independent of said second body when the air speed is outside of a predetermined range.

References Cited

UNITED STATES PATENTS 2,790,946  4/1957  Yates _____ 318—489
2,940,316  6/1960  Carey _____ 244—78 X

FOREIGN PATENTS 53,274  10/1942  Netherlands.

MILTON BUCHLER, *Primary Examiner.*

ANDREW H. FARRELL, *Examiner.*